US008229952B2

(12) United States Patent
Cras et al.

(10) Patent No.: US 8,229,952 B2
(45) Date of Patent: Jul. 24, 2012

(54) GENERATION OF LOGICAL DATABASE SCHEMA REPRESENTATION BASED ON SYMBOLIC BUSINESS INTELLIGENCE QUERY

(75) Inventors: Jean-Yves Cras, Paris (FR); Juan Francisco Calvente, Paris (FR); Yucheng Sha, Versailles (FR); Serge Thepaut, Ermont (FR)

(73) Assignee: Business Objects Software Limited, Dublin (IE)

( * ) Notice: Subject to any disclaimer, the term of this patent is extended or adjusted under 35 U.S.C. 154(b) by 344 days.

(21) Appl. No.: 12/463,757

(22) Filed: May 11, 2009

(65) Prior Publication Data

US 2010/0287185 A1    Nov. 11, 2010

(51) Int. Cl.
G06F 7/00 (2006.01)
G06F 17/30 (2006.01)
(52) U.S. Cl. ................. 707/769; 707/796; 707/E17.134
(58) Field of Classification Search .................. 707/713, 707/803, 999.3, 769, 796, E17.134, 893, 707/812, 806, 807, 999.1
See application file for complete search history.

(56) References Cited

U.S. PATENT DOCUMENTS

| 5,295,256 | A  | * | 3/1994  | Bapat ............................ 717/137 |
| 5,555,403 | A  |   | 9/1996  | Cambot et al. |
| 5,734,887 | A  | * | 3/1998  | Kingberg et al. ..................... 1/1 |
| 5,819,251 | A  | * | 10/1998 | Kremer et al. ........................ 1/1 |
| 5,930,795 | A  | * | 7/1999  | Chen et al. .............................. 1/1 |
| 6,006,224 | A  | * | 12/1999 | McComb et al. ...................... 1/1 |
| 6,490,581 | B1 | * | 12/2002 | Neshatfar et al. ..................... 1/1 |
| 6,546,381 | B1 | * | 4/2003  | Subramanian et al. ............... 1/1 |
| 7,089,235 | B2 | * | 8/2006  | Dettinger et al. ..................... 1/1 |
| 7,222,130 | B1 | * | 5/2007  | Cras et al. ....................... 707/803 |
| 7,359,908 | B2 | * | 4/2008  | Brodhun et al. .............. 707/760 |
| 7,945,597 | B2 | * | 5/2011  | Cras et al. ....................... 707/803 |
| 2002/0091681 | A1 | * | 7/2002 | Cras et al. ......................... 707/3 |
| 2003/0182273 | A1 | * | 9/2003 | Goldberg et al. ................. 707/3 |
| 2004/0193568 | A1 | * | 9/2004 | Dettinger et al. ................ 707/1 |

(Continued)

OTHER PUBLICATIONS

Leser, U., et al., "Issues in developing integrated genomic databases and application to the human X chromosome", Bioinformatics, vol. 14, No. 7, Oxford University Press, © 1998, pp. 583-590.*

(Continued)

*Primary Examiner* — John E Breene
*Assistant Examiner* — Anh Ly
(74) *Attorney, Agent, or Firm* — Buckley, Maschoff & Talwalkar LLC

(57) ABSTRACT

A system to query a database based on a logical schema of the database and an abstraction of the logical database schema, the abstraction including a plurality of objects and one or more properties associating one or more of the plurality of objects to one or more others of the plurality of objects. The system includes reception of a query including a first plurality of objects of the abstraction, a first one or more properties associating one of the first plurality of objects with another one of the plurality of objects, and two or more instances of a first one of the first plurality of objects. A dynamic representation of the logical database schema is modified to include an alias of the first one of the plurality of objects, the query is modified to include the alias, one or more functional dependencies of the abstraction to be enforced are determined based on the modified query, the modified dynamic representation of the logical database schema is edited based on the determined one or more functional dependencies, and a database query is generated based on the modified query and the edited dynamic representation.

17 Claims, 13 Drawing Sheets

U.S. PATENT DOCUMENTS

| | | | |
|---|---|---|---|
| 2005/0065927 A1* | 3/2005 | Nouri et al. | 707/4 |
| 2005/0125398 A1* | 6/2005 | Das et al. | 707/4 |
| 2005/0165799 A1* | 7/2005 | Wong | 707/100 |
| 2005/0216501 A1* | 9/2005 | Cengiz et al. | 707/103 R |
| 2006/0195427 A1* | 8/2006 | Kilroy | 707/3 |
| 2007/0088689 A1* | 4/2007 | Cras et al. | 707/4 |
| 2007/0226203 A1* | 9/2007 | Adya et al. | 707/4 |
| 2008/0016032 A1* | 1/2008 | Dettinger et al. | 707/2 |
| 2008/0091668 A1* | 4/2008 | Dettinger et al. | 707/4 |
| 2008/0109424 A1* | 5/2008 | Day et al. | 707/5 |
| 2008/0288235 A1* | 11/2008 | Dettinger et al. | 703/23 |
| 2009/0150367 A1* | 6/2009 | Melnik et al. | 707/4 |
| 2010/0161651 A1* | 6/2010 | Cras | 707/769 |
| 2010/0287185 A1* | 11/2010 | Cras et al. | 707/769 |
| 2010/0287223 A1* | 11/2010 | Cras et al. | 707/955 |

OTHER PUBLICATIONS

Papastefanatos, George, et al., "What-If Analysis for Data Warehouse Evolution", DaWaK 2007, LNCS 4654, Springer-Verlag, Berlin, Germany, © 2007, pp. 23-33.*

Tuijnman, Frank, et al., "Sharing Complex Objects in a Distributed PEER Environment", ICDCS 1993, Pittsburgh, PA, May 25-28, 1993, pp. 186-193.*

Kindingstad, Steinar A., et al., "ODL-M: A Mapping Language for Schema Integration in Object-Oriented Multidatabase Systems", Univ. of Oslo—Dept. of Informatics, Masters thesis, Aug. 1996, 201 pages.*

Loomis, Timothy P., "Audit History and Time-Slice Archiving in an Object DBMS for Laboratory Databases", Hewlett-Packard Journal, Article 10, Aug. 1997, pp. 1-11.*

Microsoft Computer Dictionary, 5th Edition, Microsoft Press, Redmond, WA, © 2002, pp. 141, 276, 300 and 510.*

Markowitz, Victor M., et al., "Object Queries over Relational Databases: Language, Implementation, and Applications", ICDE 1993, Vienna, Austria, Apr. 19-23, 1993, pp. 71-80.*

Chaudhuri, Surajit, et al., "An Overview of Data Warehousing and OLAP Technology", ACM SIGMOD Record, vol. 26, Issue 1, Mar. 1997, pp. 65-74.*

Godin, Robert, et al., "Semantic Query Optimization Using Inter-Relational Functional Dependencies", HICSS 1991, Kauai, HI, Jan. 8-11, 1991, pp. 368-375.*

Bernhard Thalheim—"The Strength of ER Modeling"—Conceptual Modeling, Lecture Notes in Computer Science, 1999, vol. 1565/1999, (pp. 227-242).*

Antonello Ceravola, Marcus Stein, and Christian Goerick—"Researching and developing a real-time infrastructure for intelligent systems—Evolution of an integrated approach"—Available online Sep. 29, 2007—Robotics and Autonomous Systems 56 (2008) vol. 56, Issue 1, Jan. 31, 2008, pp. 14-28, pp. 14-28.*

* cited by examiner

US 8,229,952 B2

GENERATION OF LOGICAL DATABASE SCHEMA REPRESENTATION BASED ON SYMBOLIC BUSINESS INTELLIGENCE QUERY

CROSS REFERENCE TO RELATED APPLICATIONS

This application is related to commonly-assigned U.S. patent application Ser. No. 12/463,702, entitled "Functionally-Dependent Analysis Objects" and filed on even date herewith.

BACKGROUND

Business data is typically stored within physical tables of a database. The database may comprise a relational database, such as Oracle, Microsoft SQL Server, IBM DB2, Teradata and the like. Alternatively, the database could be a multi-dimensional database, an eXtendable Markup Language document, or any other structured data storage system.

The structures and relationships of the physical database tables are complex. A typical end user is therefore unable to locate or extract desired information from the physical database tables. Business Intelligence tools (e.g., BusinessObjects Universe Designer®) may be used to build an abstraction layer that shields end users from the complexity of the physical tables. More specifically, the abstraction layer allows the end users to query a database using intuitive terms rather than references to specific physical entities of the database.

U.S. Pat. No. 5,555,403 describes such an abstraction layer, referred to therein as a semantic layer. Briefly, a semantic layer defines a set of "business objects" that represent business entities, such as customers, time, financial figures, etc. Business objects may be classified as dimensions (along which one may want to perform an analysis or report), details (e.g., additional information on dimensions), and measures (e.g., indicators, most often numeric, whose value can be determined for a given combination of dimension values).

The creation of a semantic layer corresponding to physical database tables typically consists of two main steps. First, a logical database schema is created to describe the structure of the physical tables. The logical database schema may be populated with a subset of the physical database tables, and is often augmented with additional entities, such as logical views and joins. Logical views include logical tables defined by Structured Query Language (SQL) expressions referencing the physical tables. Joins relate logical tables and are expressed using SQL predicates relating these tables.

Next, business objects of the semantic layer are created and mapped to the logical schema. The mapping describes how to compute a given business object using the logical entities exposed by the logical schema. For instance, a business object "Customer" could be mapped to an ID field in a Customer table entity, through an expression such as "Customer.ID". Consequently, values of the ID field in the Customer table must be accessed in order to access values of the business object "Customer".

Using the definition of a logical database schema in terms of the underlying physical schema, and the mapping of the business objects in terms of entities in the logical database schema, it is possible to receive symbolic queries that only reference business objects, and to generate physical queries against the physical database based on the symbolic queries.

FIG. 1 is a block diagram illustrating the foregoing scenario. Database 110, which may comprise any structured data storage, includes physical tables 115. Logical database schema 120 includes entities associated with some or all of physical tables 115, as well as additional entities, such as logical views and joins. Abstraction layer 130 includes business objects mapped to entities of logical database schema 120.

Consumer 140, which may comprise a reporting tool or any other system requiring access to the data of physical tables 110, views and interacts with the business objects of abstraction layer 130. Consumer 140 may transmit a symbolic query including one or more of the business objects to abstraction layer 130. Query generator 150 then generates a database query based on the symbolic query and the mapping between logical database schema 120 and abstraction layer 130.

Conventional systems require significant processing in order to eliminate possible ambiguities in the symbolic queries created by end users. For example, FIG. 2 illustrates one example of database schema 200 including a table associated with several many-to-one relationships. Accordingly, database schema 200 presents a conventional "fan trap" problem.

Schema 200 describes a database which stores information about customers who spend their holidays in resorts. Both the customers and the resorts are located in cities. Information about cities is centralized in dimension table 210, which itself has a many-to-one relationship to dimension table 220 of countries.

Conventional Business Intelligence systems do not support Business Intelligence queries using a schema such as schema 200. For example, a business object name may be mapped to the "City" table 210, and a user may use the business object to request "sales per city". The query would be considered ambiguous, because the query would not specify whether the user is requesting the amount of sales per city of customers, or the amount of sales per city of resorts.

To address the foregoing, a designer of a conventional system creates a logical alias of each logical table that is a "fan trap", and a logical alias of all tables to which the fan trap relates. Then, different user-friendly names will be associated to each of the aliased tables. For example, in view of schema 200, a designer using Business Objects' "Universe Designer" tool may create logical database schema 300 of FIG. 3, which includes logical aliases (310, 315) of City table 210 and logical aliases (320, 325) of Country table 220.

An abstraction layer can then simply associate a business object with each of the aliased tables, allowing a user to query, for instance, "sales by country of customer" without any ambiguity. Creation of a "logical alias" does not require creation of corresponding physical tables or duplicate data. In the case of logical database schema 300, only one physical table remains for each of the "City" and "Country" entities of the database schema, and each of the aliased tables is a logical view of one of these tables. The relationships from one aliased table to the other are properties of the alias, not of the physical table itself.

However, the creation and maintenance of aliases entails significant costs. For each entity in a database schema having several many-to-one relationships converging to it, the logical database schema must include aliases of not only this entity but also all the entities to which it has a foreign key. In the abstraction layer, business objects must also be created for each of the aliases. Human supervision of aliases is necessary, because the need for an alias sometimes cannot be deduced automatically by an authoring environment.

Moreover, if the physical database schema changes, aliases of the logical database schema need to be updated. For example, if a database designer adds a new "Region" table between City table 210 and Country table 220 to database schema 200, one distinct alias of the new table must be added between entities 310 and 320 of logical schema 300 and another alias of the new table must be added between entities 315 and 325 of logical schema 300.

Conventional aliasing in a logical database schema also limits the expressiveness of queries in arbitrary ways. For example, physical schema 400 of FIG. 4 describes a database which captures information about goods being shipped from one country to another. It may be desirable to compute the difference between the value of goods exported from a country and the value of goods imported by the country, but the conventional static aliasing mechanism makes such computation difficult.

FIG. 5 illustrates logical database schema 500 corresponding to physical schema 400 according to conventional systems. Logical database schema 500 includes two aliases, and a user may use the corresponding business objects to determine a matrix summing sales from each country of origin to each country of destination. However, since the two aliases are mapped to different business objects that have nothing in common, no efficient method exists for representing the fact that a given country can be both a country of origin and a country of destination.

Yet another issue arises if different measures from different fact tables can be used to relate the same dimensions. For example, a Reservations fact table may be added to schema 200. Like the Sales fact table, the Reservations fact table may include data related to customers and resorts. If a query only specifies dimensions such as customer and resorts, but no measure, then an ambiguity exists as to which of the fact tables should be used to relate the dimensions. More particularly, the user may want to know which customers are actually staying in which resort, or which customers are booking stays in which resort. In order to solve such ambiguities, some systems associate a context—a list of authorized joins—to a fact table, and ask the user to specify which context should be used. Other systems, in which all dimensions are considered orthogonal, may simply use a default measure.

What is needed is an efficient system to create and fulfill unambiguous database queries. Such a system preferably avoids the cost of maintaining complex static aliases or contexts, and provides greater expressive power than current systems.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
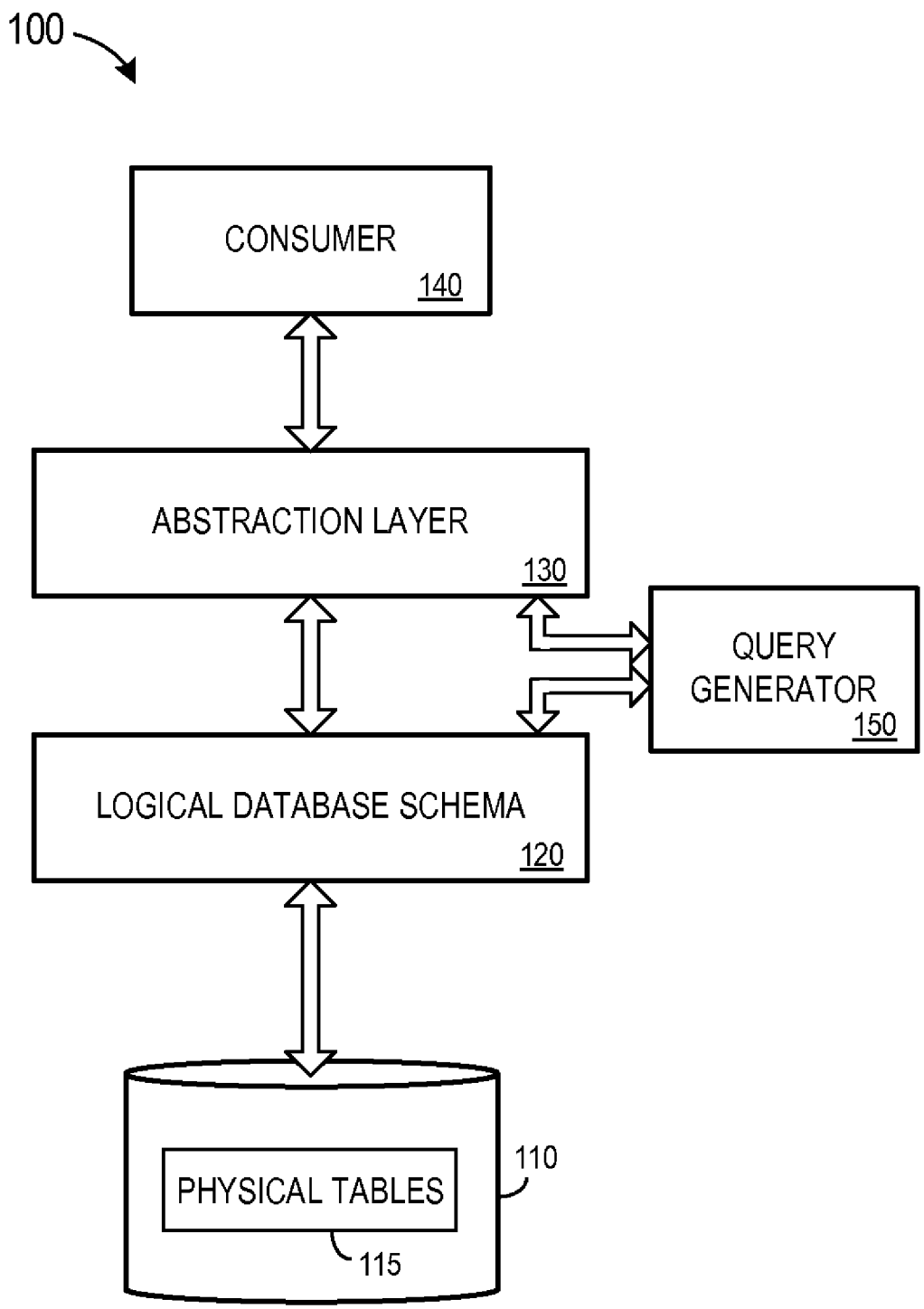
FIG. 1 is a block diagram of a system to generate a database query.

Embodiments may be implemented according to an architecture such as that illustrated in FIG. 1. Database 110 may comprise any query-responsive data source or sources that are or become known, including but not limited to a relational database management system. Physical tables 115 of data source 110 may store business data of any sort in any form. Physical tables 115 conform to a physical database schema as described above.

Logical database schema 120 includes entities associated with some or all of physical tables 115, as well as additional entities, such as logical views and joins. Abstraction layer 130 includes business objects, each of which may associate one or more entities stored of logical database schema 120 with user-friendly names.

Query generator 150 may receive a symbolic query from consumer 140 consisting of objects of abstraction layer 130. Details of a symbolic query according to some embodiments will be provided below. Query generator 150 may generate a query of database 110 (e.g., a series of SQL statements) based on the symbolic query, logical database schema 110, and on object properties specified in abstraction layer 130. Again, specifics of the query generation are set forth below.

Each illustrated element of FIG. 1 may be implemented by any suitable combination of hardware and/or software. Each element may be located remotely from one or more other elements. More than one element may be implemented in a single device and/or software package. Logical database schema 120 and abstraction layer 130 may be provided by a computer executing program code stored on a computer-readable medium. In some embodiments, logical database schema 120 and abstraction layer 130 are embodied within a single BusinessObjects Universe.

Figure 6:
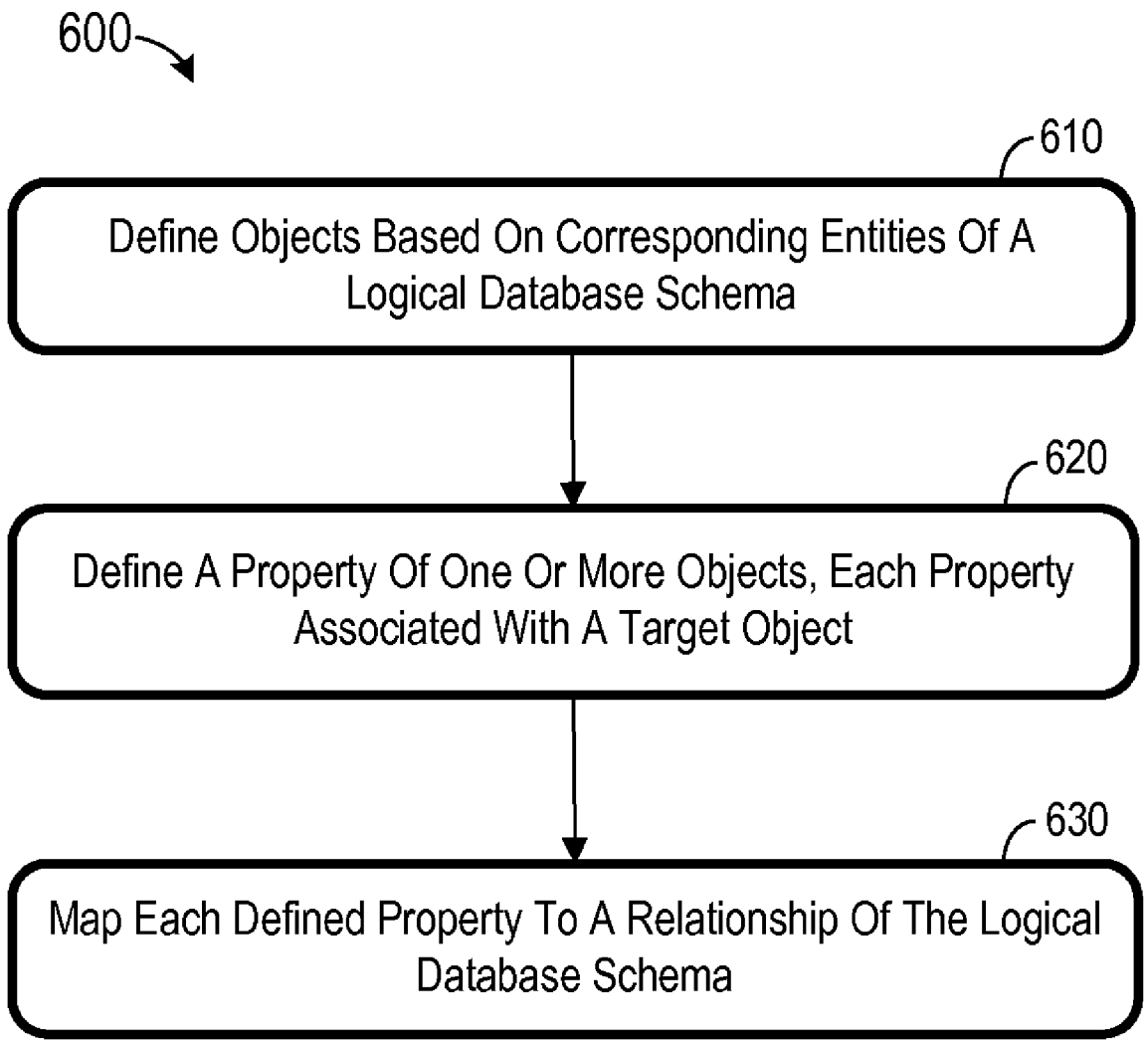
FIG. 6 is a flow diagram of a process to define an abstraction layer according to some embodiments.

FIG. 6 is a flow diagram of process 600 to define an abstraction layer according to some embodiments. Process 600, and all other processes described herein, may be executed by hardware and embodied in program code stored on a tangible computer-readable medium. Process 600 may be performed using the Universe Designer tool described above, but examples are not limited thereto.

Figure 7:
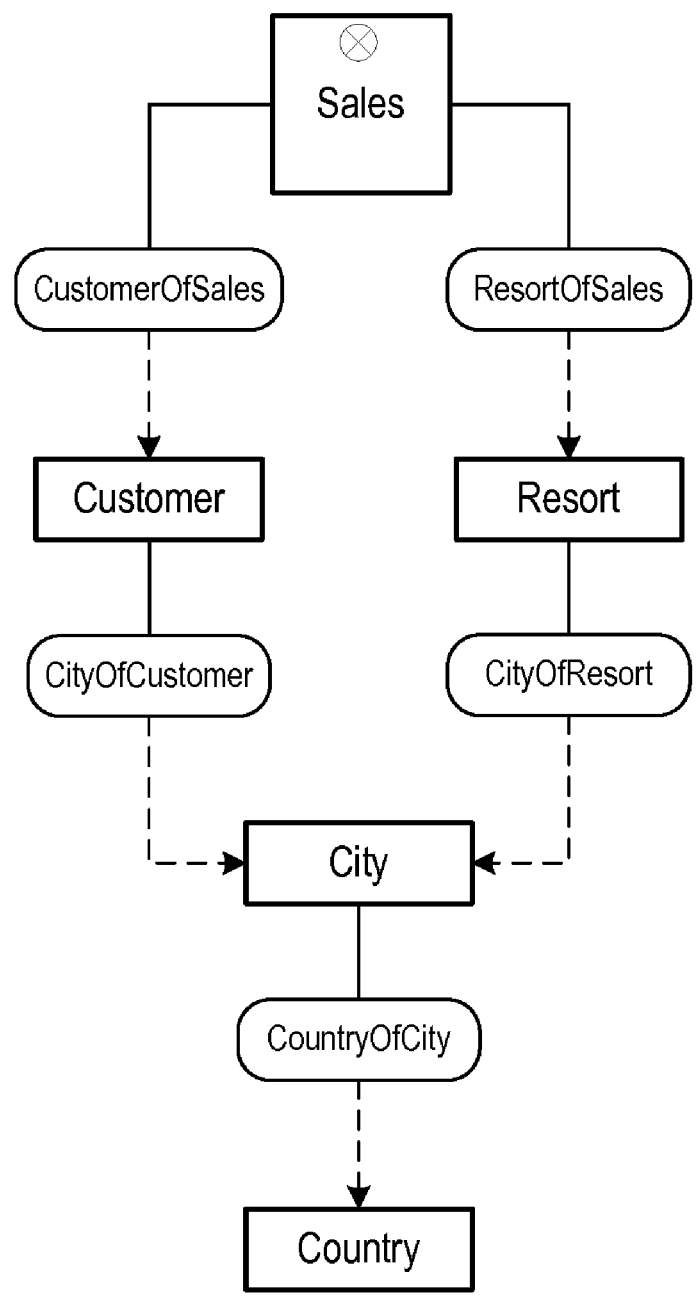
FIG. 7 is a representation of an abstraction layer corresponding to the FIG. 2 logical database schema according to some embodiments.

Initially, at 610, objects are defined based on corresponding entities of a logical database schema. For example, an object of abstraction layer 130 may be defined for each logical table of logical database schema 120. FIG. 7 illustrates thusly-defined objects according to some embodiments. In particular, dimension objects Customer, Resort, City and Country have been defined, and each is bound to a corresponding one of logical tables Customer, Resort, City and Country of schema 200. A measure object Sales is also defined as the sum of sales numbers in the Sales fact table of schema 200.

Next, at 620, a property is defined for one or more of the defined objects. Each defined property is associated with a target object. In contrast to conventional abstraction layers, embodiments allow association of an object S with a named property P which designates a value of some other object T. Object S will be referred to as the "source" of property P, and object T will be referred to as the "target" of property P.

Returning to the present example, FIG. 7 illustrates a CountryOfCity property of source object City, whose target is the object Country. The object Customer has a CityOfCustomer property whose target is the object City, and the object Resort has a CityOfResort property whose target is also the object City. The measure object Sales is associated with a CustomerOfSales property with target object Customer, and with a ResortOfSales property with target object Resort.

Figure 4:
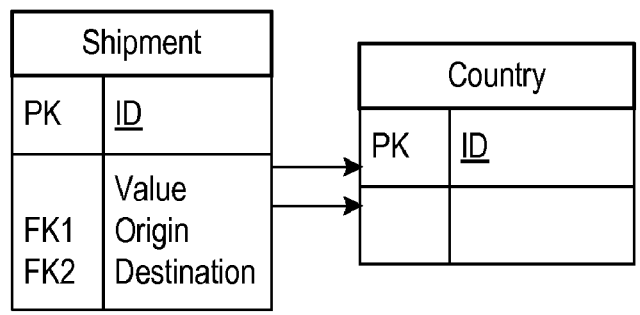
FIG. 4 is a representation of a database schema.
Figure 5:
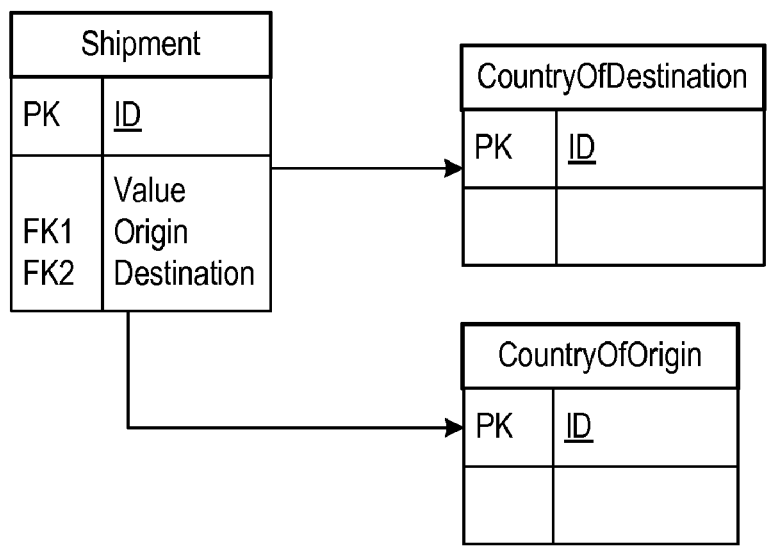
FIG. 5 is a representation of a prior art static logical database schema based on the FIG. 4 database schema.
Figure 8:
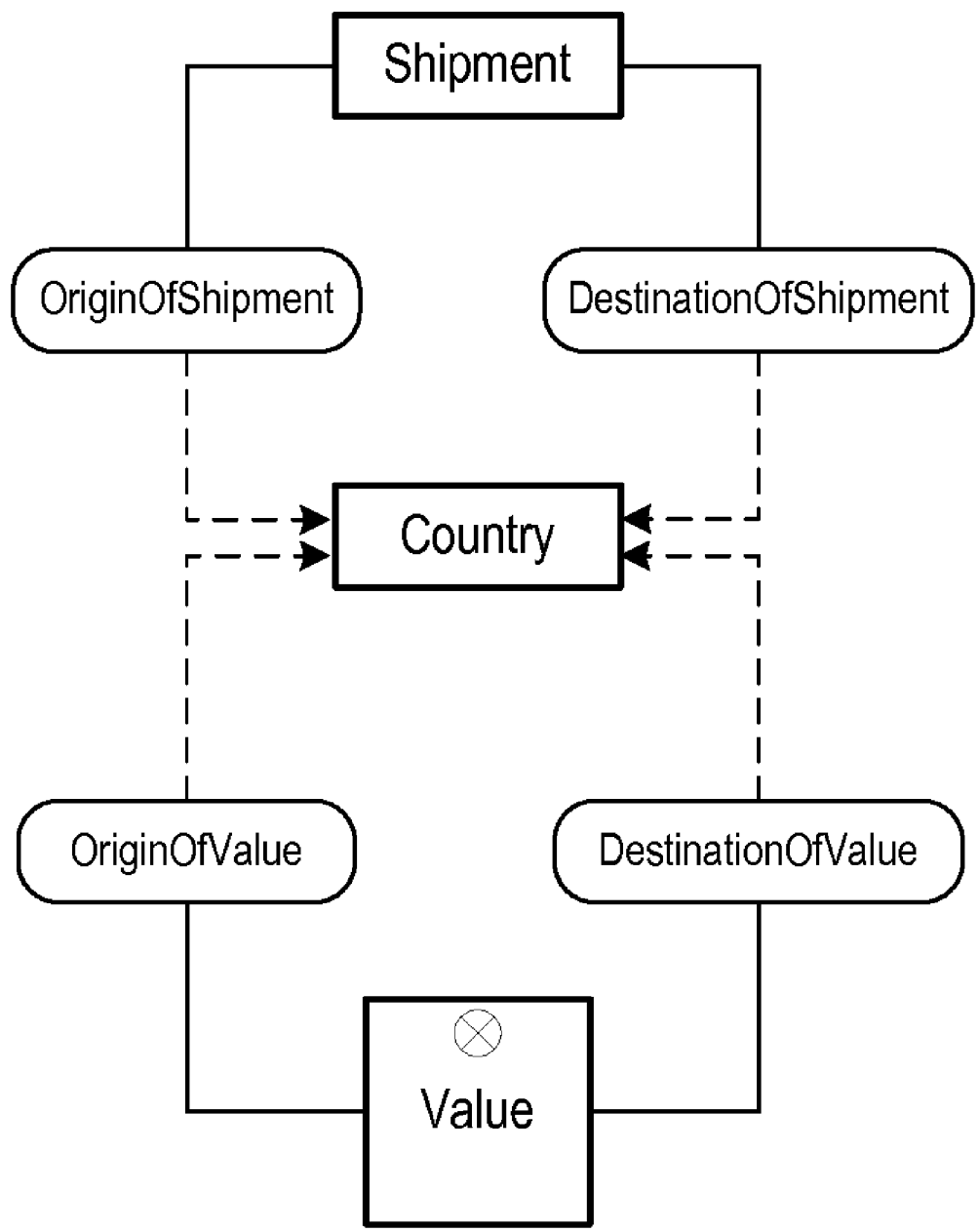
FIG. 8 is a representation of an abstraction layer corresponding to the FIG. 4 logical database schema according to some embodiments.

To further explain process 600, FIG. 8 is a representation of abstraction layer objects and properties corresponding to logical database schema 400 of FIG. 4. According to 610, dimension objects Shipment and Country are created. Also created is measure object Value, which represents the sum of Value fields in the Shipment table. The Shipment object is associated with two properties having the same target object, OriginOfShipment and DestinationOfShipment. The measure object Value is also associated with two properties, OriginOfValue and DestinationOfValue, each with the same target object Country.

In some implementations, if an object S has only one property with a target object T, the property could be named after the target object T as a convenience. For example, if an object City has only one property whose target is the object Country, then this property could also be named Country. Two different properties can have the same name and represent two distinct entities if their source objects are different.

Each defined property is mapped to a relationship in the underlying logical database schema at 630. The mapping of a property could designate a relationship that relates some entity defining its source object and some entity defining its target object. For instance, if the abstraction layer is based on a relational data source, then an object of the layer object is mapped to one or several logical tables in the logical schema, and a property of the object is mapped to a join path that relates these tables. A join path is defined as a list of joins that relate fields of the source entity and target entity in the logical schema. Individual joins, which form the simplest relationships between logical entities, can be added to or removed from the logical schema.

Turning back to the abstraction layer of FIG. 7, the property CityOfResort of the object Resort can be mapped to the join that relates the logical tables Resort and City of schema 200, and the property CityOfCustomer of the object customer can be mapped to the join that relates the logical tables Customer and City. In the example of FIG. 8, the property OriginOfShipment is mapped to one of the joins (i.e., the one that has the predicate "Shipment.Origin=Country.ID") between the Shipment and Country tables of schema 400, and the property DestinationOfShipment is bound to the other join (i.e., predicate "Shipment.Destination=Country.ID").

Figure 2:
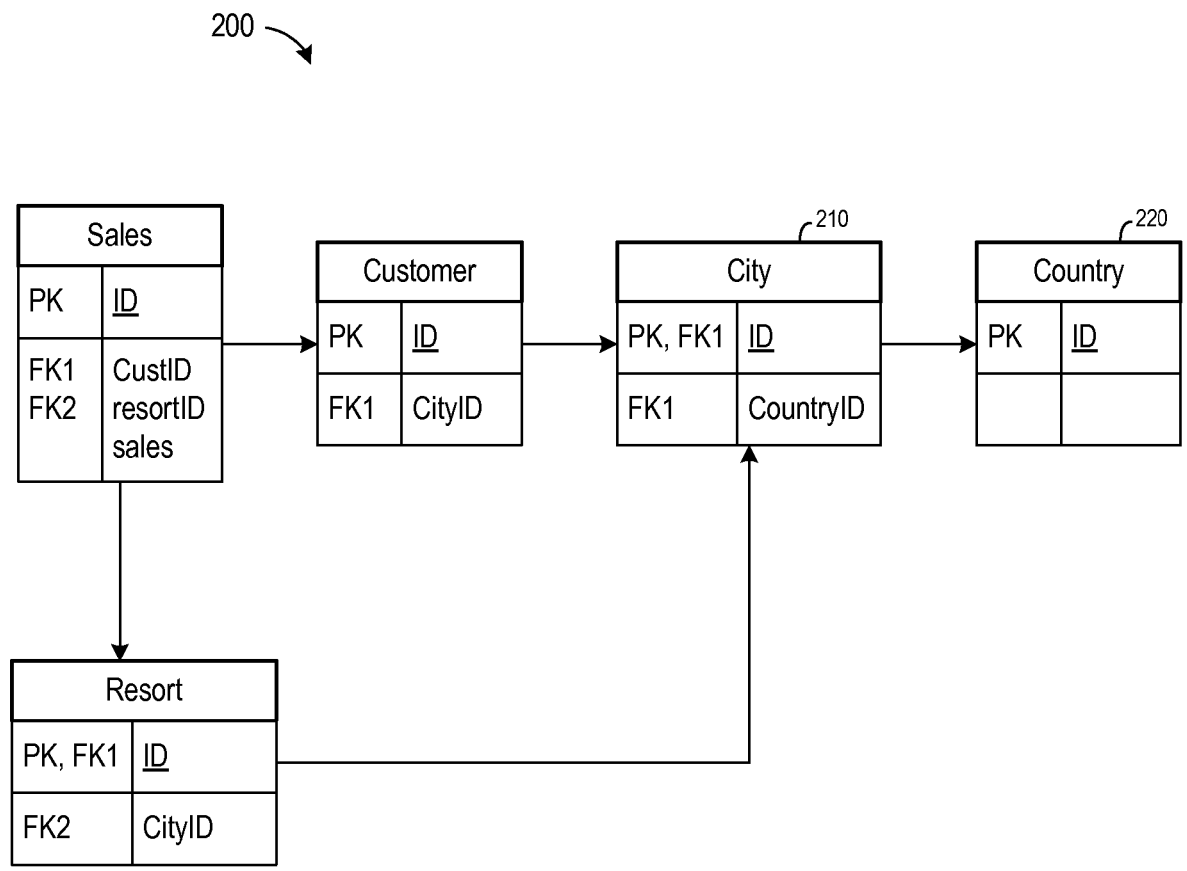
FIG. 2 is a representation of a database schema.
Figure 3:
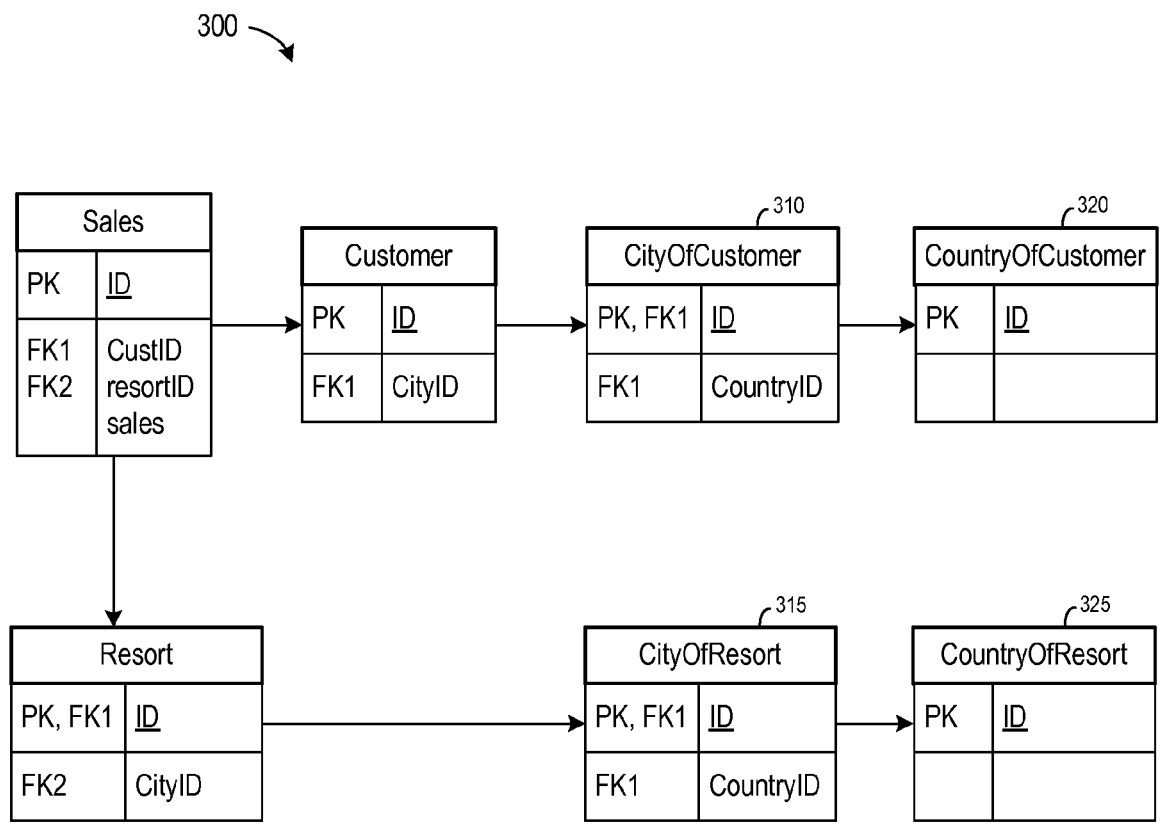
FIG. 3 is a representation of a prior art static logical database schema based on the FIG. 2 database schema.

If a source object is associated with only one property that has a given target object, the joins to which the property is mapped may be determined automatically. Specifically, a symbolic query is created that relates the source object and the target object. Processing of the query will result in a list of joins that relate the tables involved in the query. This list of joins therefore defines the mapping of the property. With respect to FIG. 7 and FIG. 2, processing of the query (Resort, City) would identify the join between the Resort and City logical entities and thereby provide the mapping for the property CityOfResort.

If a source object is associated with multiple properties having the same target object, as shown in FIG. 8, the mapping may be determined by creating a property for each column in the source table that is a foreign key to another table, and looking for a path that joins the source and target tables using the selected foreign key. In more detail, there are multiple ways of joining the table Shipment and the table Country of schema 400. However, if each of the two foreign keys Origin and Destination are selected in turn, then for each of these foreign keys there is only one way of joining the Shipment table to the Country table in a way that uses the selected foreign key. Determining this unique join predicate may also be performed automatically, since each predicate compares the value of the selected foreign key with the value of the target table's primary key.

In more complex cases, it may be necessary for the designer to provide input about the join to which a given property is mapped. For example, the designer may graphically select one or several joins that should be used or avoided to relate the source and target tables.

An abstraction layer created and mapped according to process 600 may support the expression of non-ambiguous queries that use the notion of properties, and to interpret these queries without creating static aliases or contexts in an underlying logical schema.

Figure 9:
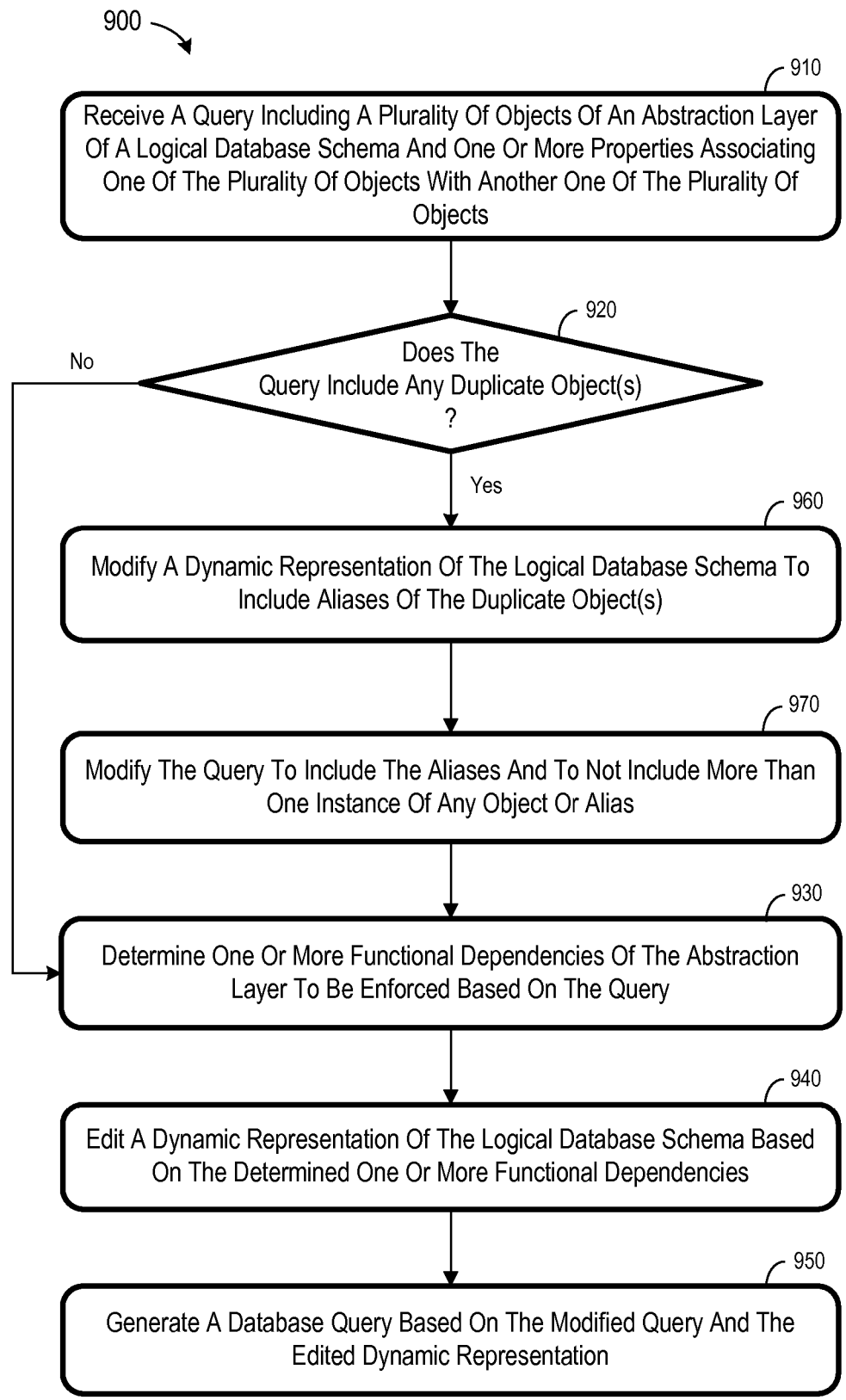
FIG. 9 is a flow diagram of a process to generate a database query according to some embodiments.

FIG. 9 is a flow diagram of process 900 to interpret queries generated based on an abstraction layer as described above. Process 900 may be embodied by query generator 150 in some embodiments.

A query is received at 910. The query includes a plurality of objects of an abstraction layer of a logical database schema. The query also includes one or more properties associating one of the plurality of objects with another one of the plurality of objects. In this regard, the received query is said to include one or more "chains" of objects and properties.

To facilitate the following description, the notions of "direct chain" and "reverse chain" are now discussed. A direct chain is defined by one object, called an initial object, and a sequence of zero or more properties, such that: 1) the source of the first property (if there is one) is the initial object; 2) the source of each additional property is the target of its predecessor; and 3) the target of the last property (if any) is called the final object (i.e., if the chain contains no property, then the final object and the initial object are the same).

Chains will be represented through names of objects and properties separated by a dot, but embodiments are not limited thereto. It is expected that an end user would construct a chain of a query through a graphical interface which would not require manual typing of the elements of the chain according to a designated format.

A query can contain a direct chain. With respect to FIG. 7, a query may include Sales and Resort.CityOfResort.CountryOfCity. This query is intended to retrieve the sum of sales for all resorts in a given country. The expression Resort.CityOfResort.CountryOfCity designates a direct chain whose initial object is the object Resort. The final object is the target of the property CountryOfCity (i.e., the object Country).

A query based on FIG. 8 may include Value, Value.OriginOfValue and Value.DestinationOfValue. This query is intended to retrieve the total value of goods shipped from any one country to any other.

A reverse chain is used to navigate properties from target object to source object. Unlike a direct chain, a reverse chain is defined by an object called the final object, and a sequence of at least one property written from right to left at the left of the final object. Accordingly, the source object of the first property is the final object, the source object of each additional property is the target object of the one on the right, and the target object of the leftmost property is called the initial object.

Reverse chains may be particularly useful when used with measure objects. For instance, the query (Country,CustomerOfSales.Sales) attempts to calculate, for each country, the total sales revenue generated by customers in the country. The query uses a reverse chain, of which the final object is Sales, and of which the initial object is Customer (i.e., the target of the CustomerOfSales property). In contrast, another query, (Country,ResortOfSales.Sales) would represent, for each country, the revenue generated by resorts in this country.

Similarly, the query (Country,OriginOfValue.Value) of the FIG. 8 layer retrieves, for each country, the total value of goods shipped from this country, and the query (Country, DestinationOfValue.Value) retrieves the total worth of goods imported by this country.

A reverse chain is associated to a direct chain that is being navigated backwards. The final object of one is the initial object of the other. For instance, the reverse chain CountryOfResort.ResortOfSales.Sales is the reversed form of the direct chain Sales.ResortOfSales.CountryOfResort.

Generally, a chain is made of a sequence of direct and reverse chains, such that the final object of one elementary chain is equal to the initial object of the next. In addition, if a reverse chain is followed by a direct chain, then the initial object of the direct chain is redundant (i.e., it also appears as the final object of the reverse chain) and the initial object can be removed.

Also with respect to FIG. 7, the query (Customer, Customer.CityOfCustomer.CityOfResort.ResortOfSales.Sales) is intended to retrieve, for each customer, the global sales revenue generated by resorts in the customer's city. The chain in this query has been built from the direct chain Customer.CityOfCustomer (which designates the city of a given customer) and the reverse chain CityOfResort.ResortOfSales.Sales (which designates the sales revenue generated by the resorts in a city).

Chains can also define new semantic layer entities. Rather than being defined in terms of which database tables they map, these calculated objects are defined in terms of other objects. Embodiments may thereby provide for useful shortcuts and for additional expressive power. As examples, the FIG. 7 semantic layer may define a CountryOfCustomer object using the chain Customer.CityOfCustomer.CountryOfCity, and the FIG. 8 semantic layer may define a commercial balance object as OriginOfValue.Value-DestinationOfValue.Value. For a given country, the preceding expression computes the difference between the worth of exported goods and the worth of imported goods.

Returning to process 900, it is determined at 920 whether any objects appear more than once in the received query, either explicitly or as the source or target object of a property in a chain. For example, the object City appears twice (i.e., as the final object in two chains) in the query (Sales, Customer.CityOfCustomer,Resort.CityOfResort). At present, it will be assumed that the received query does not include any such duplicate objects. Flow therefore proceeds to 930 to determine one or more functional dependencies of the abstraction layer to be enforced based on the query.

A functional dependency exists between a source object S and a target T if a direct chain exists of which the initial object is S and the final object is T. If so, S is the source object of the functional dependency, and T is its target object. The abstraction layer of FIG. 7 includes exactly one functional dependency from the object Customer to the object Country because the objects are related by the direct chain Customer.CityOfCustomer.CountryOfCity. Two functional dependencies are present from the object Sales to the object "City", because two direct chains exist from one to the other: Sales.ResortOfSales.CityOfResort; and Sales.CustomerOfSales.CityOfCustomer. No functional dependency exists from Customer to Resort, because no direct chain from the former to the latter exists.

A functional dependency can be mapped to a list of joins. The mapping of a functional dependency is the list of all joins bound to each of the properties in the direct chain represented by the functional dependency.

A query's chain will be used to retrieve values of its final object. These values are calculated with respect to functional dependencies which are taken into account (i.e., enforced). Enforcing a functional dependency between two objects causes at most one value of the target object to be retrieved for each value of the source object. The list of joins that is bound to the enforced functional dependency may be applied to retrieve the data. If a functional dependency is not enforced, the list of joins that is bound to the functional dependency will not be used to retrieve the data.

A query's semantics are therefore subject to the determination of which of the existing functional dependencies will be enforced. In some embodiments of 930: 1) any functional dependency that is explicitly mentioned in the query through a direct chain or reverse chain will be enforced; 2) any functional dependency that relates the initial objects of chains in the query will be used; and 3) any other functional dependency will be denied.

As an example of 930 according to some embodiments, it is assumed that the query (Sales, Customer.CityOfCustomer), built upon the abstraction layer of FIG. 7, is received at 910. This query is to retrieve the sales aggregated by cities of customers (i.e., without regard of which resort these customers are visiting). These semantics may be determined more formally by determining which of all available functional dependencies will be enforced.

All explicitly-appearing functional dependencies are to be enforced. Accordingly, the functional dependency from Customer to City (through the property CityOfCustomer) is to be enforced. Second, all the functional dependencies that relate the initial objects of the chains are identified. In the present example, the two initial objects are Sales and Customer. Since a functional dependency exists from Sales to Customer (e.g., through the property CustomerOfSales) this functional dependency is also determined to enforced.

In a more complicated example, the query Resort,CityOfCustomer.CustomerOfSales.Sales is to retrieve, for each resort, the total sales for all customers who live in the city of the resort. The functional dependency that relates Sales to City through Customer (which is navigated in reverse order by the chain in the query) is explicitly mentioned in the chain and is therefore determined to be enforced. Next, one functional dependency relating the two initial objects Resort and City (through the property CityOfResort) is identified.

All other functional dependencies will be denied. For example, the functional dependency that relates Sales to Resort (through the property ResortOfSales) will not be enforced. As a result, whereas it is possible to aggregate sales per resort, such aggregation will not occur in this query, in accordance with the intended semantics.

In the case of the received query (Country, Sales), there is no chain and any functional dependency that relates the two initial objects Sales and Country is to be enforced. Two such functional dependencies exist: one that relates Sales to Country through the properties CustomerOfSales, CityOfCustomer and CountryOfCity; and one that relates Sales to Country through the properties ResortOfSales, CityOfResort and CountryOfCity. Both functional dependencies are to be enforced, so that the sales will be aggregated both on the resorts of each country and on the customers of each country. Therefore, this query determines, for each country, the sales generated by customers of the country going to resorts of the country.

After determining the functional dependencies to be enforced, a dynamic representation of the corresponding logical schema is edited at 940. The representation is edited based on the functional dependencies to be enforced.

Again considering the sample query (Sales, Customer.CityOfCustomer), it was determined above that the functional dependency from Customer to City (through the property CityOfCustomer) and the functional dependency from Sales to Customer (through the property CustomerOfSales) are to be enforced. All other functional dependencies are denied, specifically the functional dependency that relates Sales to City through the ResortOfSales and CityOfResort properties, and the functional dependency that relates City to Country through the CountryOfCity property.

Figure 10:
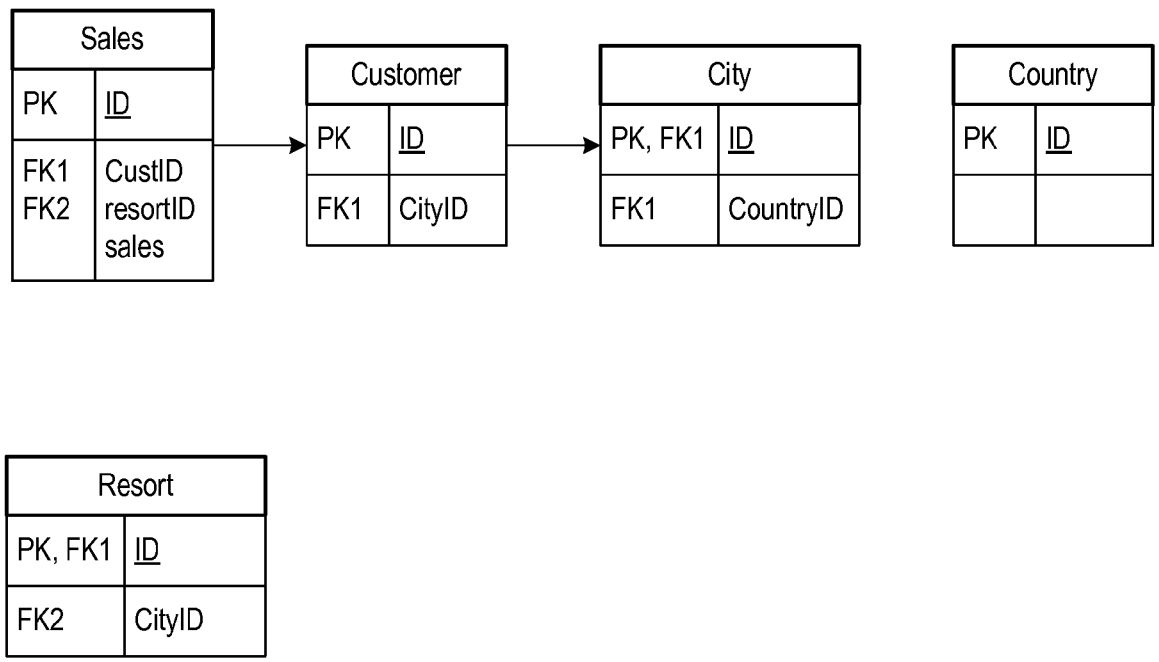
FIG. 10 is a representation of a logical database schema edited based on enforced functional dependencies according to some embodiments.

With reference to logical schema 200, the denied functional dependencies are mapped to the joins between Sales and Resort, between Resort and City, and between City and Country. These joins are (temporarily) removed from logical schema 200 to obtain the FIG. 10 schema. The FIG. 10 schema may temporarily reside in memory separately from logical schema 200.

A database query is generated at 950 based on the edited representation of the logical schema and the query. According to some embodiments, generation of SQL for the query is equivalent to selecting a path in the edited representation of the logical database schema that relates all tables that are mapped to final objects of the query. Direct SQL generation based on the knowledge of the object and property mapping is also possible. In the present example, the tables Sales and City are mapped to final objects of the query. Accordingly, the following SQL may be generated at 950:

```
SELECT sum(Sales.sales), City.ID
FROM Sales, Customer, City
WHERE Sales.CustID = Customer.ID AND Customer.CityID = City.ID
GROUP_BY City.ID
```

Queries in which a same object appears several times will now be considered. As mentioned above, it is determined at 920 whether a same object appears more than once in a received query, either explicitly or as the source or target of a property in a chain. If so, flow proceeds to 960 to modify a dynamic representation of the logical database schema to include aliases of the duplicate objects.

In order to alias an object, a temporary copy of the object is created. The copied object is mapped to physical data using an alias of the original object's mapped table or tables. The aliased object may also include aliases of some (but not necessarily all) of the properties of its original object, and such aliased properties rely on aliased joins between the aliased tables. Other objects that include a property targeting the original object may (temporarily) receive a new property targeting the alias, as described below.

Aliasing a chain includes aliasing all objects in the chain. However, only the properties that are used in the chain to relate the objects to one another are duplicated in the aliased copies. Not all duplicate objects of a query are aliased in some embodiments of 960.

The object City appears twice (i.e., as the final object in the two chains) in the query (Sales, Customer.CityOfCustomer, Resort.CityOfResort). Informally, the query is intended to determine, for any two cities A and B, how many customers from city A will visit resorts in city B. Due to the intended semantics, it is undesirable to apply the same functional dependencies to each instance of the object City.

In another example, the query (Sales, Customer.CityOfCustomer.CountryOfCity,Resort.CityOfResort.CountryOfCity) aggregates sales per country of customer and country of resort. Here again, it is undesirable to use the same functional dependencies to determine each of the two instances of the object Country, and each of the two instances of the object "City" (which now appears twice as the target for a property).

Lastly, the query (Customer, Customer.CityOfCustomer, Customer.CityOfCustomer.CountryOfCustomer) retrieves the city and country of each customer. The object Customer appears three times, but usage of the same functional dependencies for the three instances, which refer to the same object in each of the chains, does not appear problematic.

In view of the above examples, if an object appears several times in the chains of a query, and if the prefix (the left part) of the chains that lead to this object are not all identical, then 1) the object is aliased once for each different prefix; 2) each alias is related to its prefix by an aliased property (either in direct or reverse mode); 3) if the prefix is empty, then all properties relating this object to another one are also aliased; 4) each suffix (right part of a chain after the object) is also aliased, unless all of its objects appear only once in the query; and 5) each alias of the object is related to the alias of its suffix (or the suffix if it was not aliased).

With respect to the above query (Sales, Customer.CityOfCustomer.CountryOfCity,Resort.CityOfResort.CountryOfCity), the object City appears twice, and the two prefixes that lead to it (i.e., Customer.CityOfCustomer and Resort.CityOfResort) are different. Consequently, two aliases of object City (i.e., City1 and City2) are created. The aliases are only logical and need not be materialized in the database. Also created are two aliases of object Country (i.e., Country1 and Country2) which appears in the two suffixes of object City.

The object City1 is related to object Customer by a new temporary property City1OfCustomer, that relates Customer to City1. The object City1 is also related to object Country1 through a property Country1OfCity1, that has the same mapping as its original property CountryOfCity. Also, the object City1 is mapped to a temporarily-created logical alias of the table City. Any SQL generated for the object City1 will thus target the logical table City1 rather than the physical table City.

The object City2 is related to object Resort by a new temporary property City2OfResort, that relates Resort to City2. The temporary property City2OfResort is also related to object Country2 through a property Country2OfCity2, that has the same mapping as its original property CountryOfCity.

The query is modified at 970 to include the aliases. Continuing with the above example, the modified query is (Sales, Customer.City1OfCustomer.Country1OfCity1, Resort.City2OfResort.Country2OfCity2).

Since the modified query only includes one instance of each named object, flow then proceeds to 930 and continues as described above based on the modified query and on the modified representation of the logical schema including the aliases.

Figure 11:
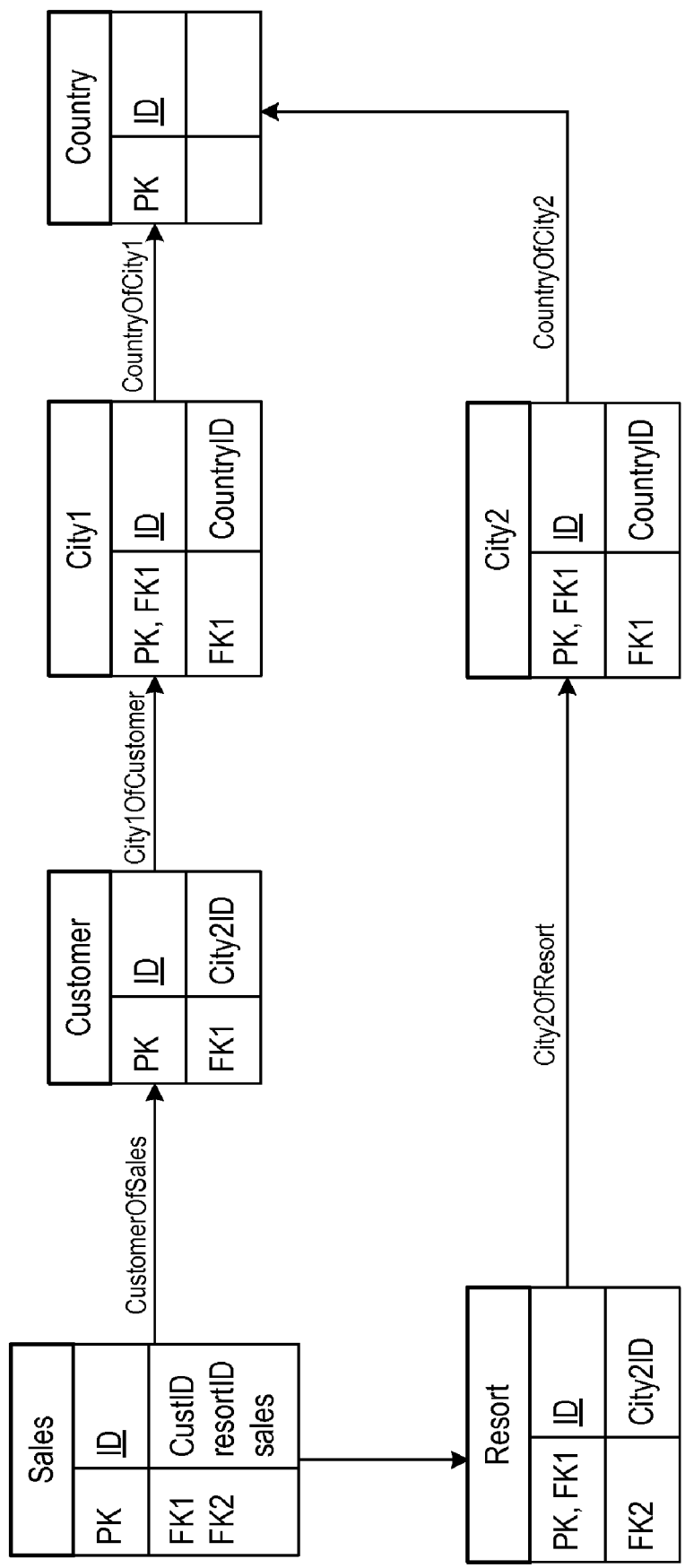
FIG. 11 is a representation of a logical database schema modified to include aliases according to some embodiments.

In a specific example, the query (Sales, Customer.CityOfCustomer,Resort.CityOfResort) is considered. As described above, the object City appears twice as a final object and is therefore aliased at 960. The properties that relate the left prefixes of both chains to the aliased object are also aliased, resulting in the modified logical database schema of FIG. 11.

Figure 12:
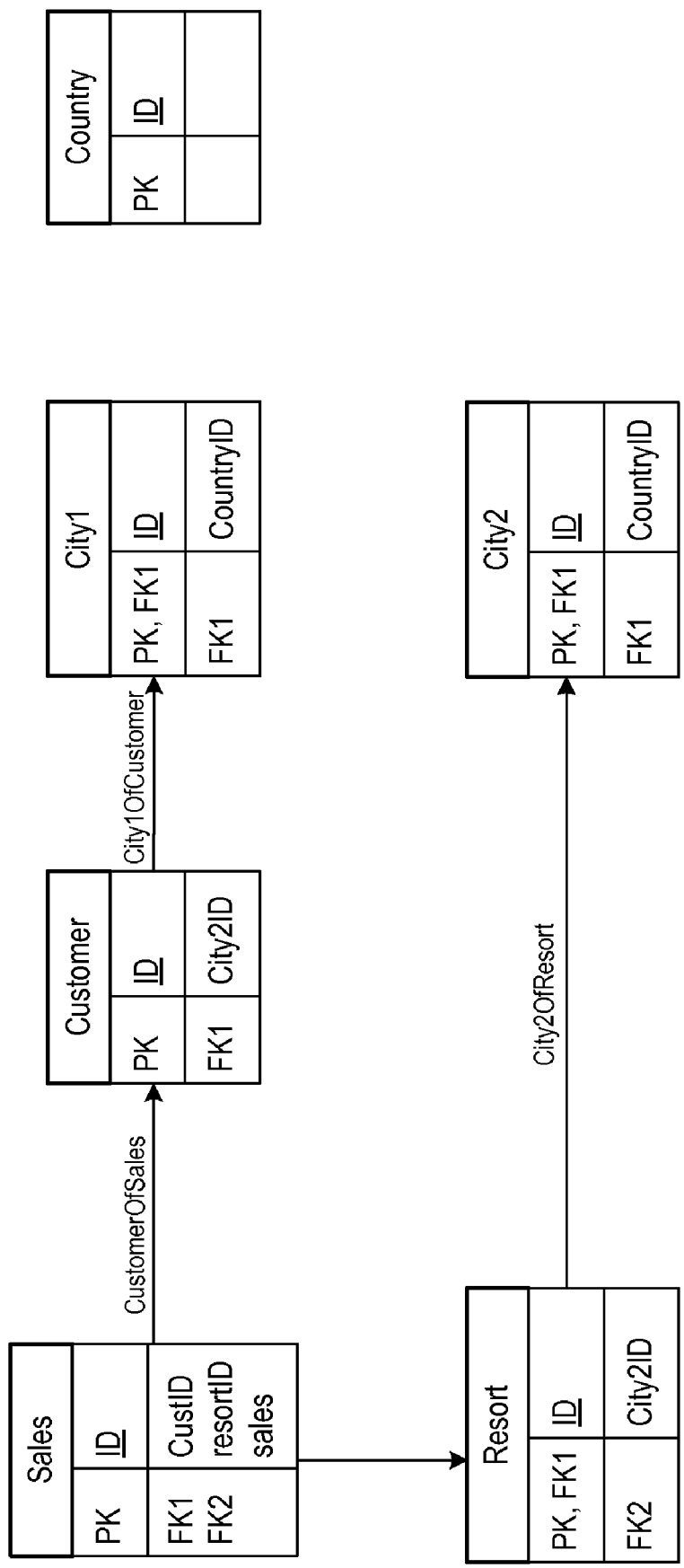
FIG. 12 is a representation of the FIG. 11 logical database schema edited based on enforced functional dependencies according to some embodiments.

Then, at 970, the query is modified to (Sales, Customer.City1OfCustomer,Resort.City2OfResort). It is determined at 930 to enforce the functional dependencies between Sales and Customer and between Sales and Resort, in addition to the functional dependencies explicitly mentioned in the chains. All other functional dependencies are therefore denied and their corresponding joins removed, resulting in the edited logical database schema of FIG. 12.

A database query is generated at 950 based on the edited representation of the logical schema and the modified query. According to some embodiments, the following SQL is generated:

```
SELECT sum(Sales.sales), City1.ID, city2.ID
FROM Sales, City City1, City City2, Resort, Customer
WHERE
(Sales.CustID = Customer.ID) AND
(Customer.CityID = City1.ID) AND
(Sales.ResortID = Resort.ID) AND
(Resort.CityID = City2.ID)
GROUP BY City1.ID, City2.ID
```

Yet another example of process 900 involves the computation of measures aggregated in a different aggregation context or grouping set than the one specified by the result objects of the query. For instance, the query (Resort, CityOfResort.ResortOfSales.Sales) may be received at 910. The query calculates, for each resort, the revenue generated in all resorts in its city. This can further be used to calculate the relative contribution of the resort to its city's revenue.

Figure 13:
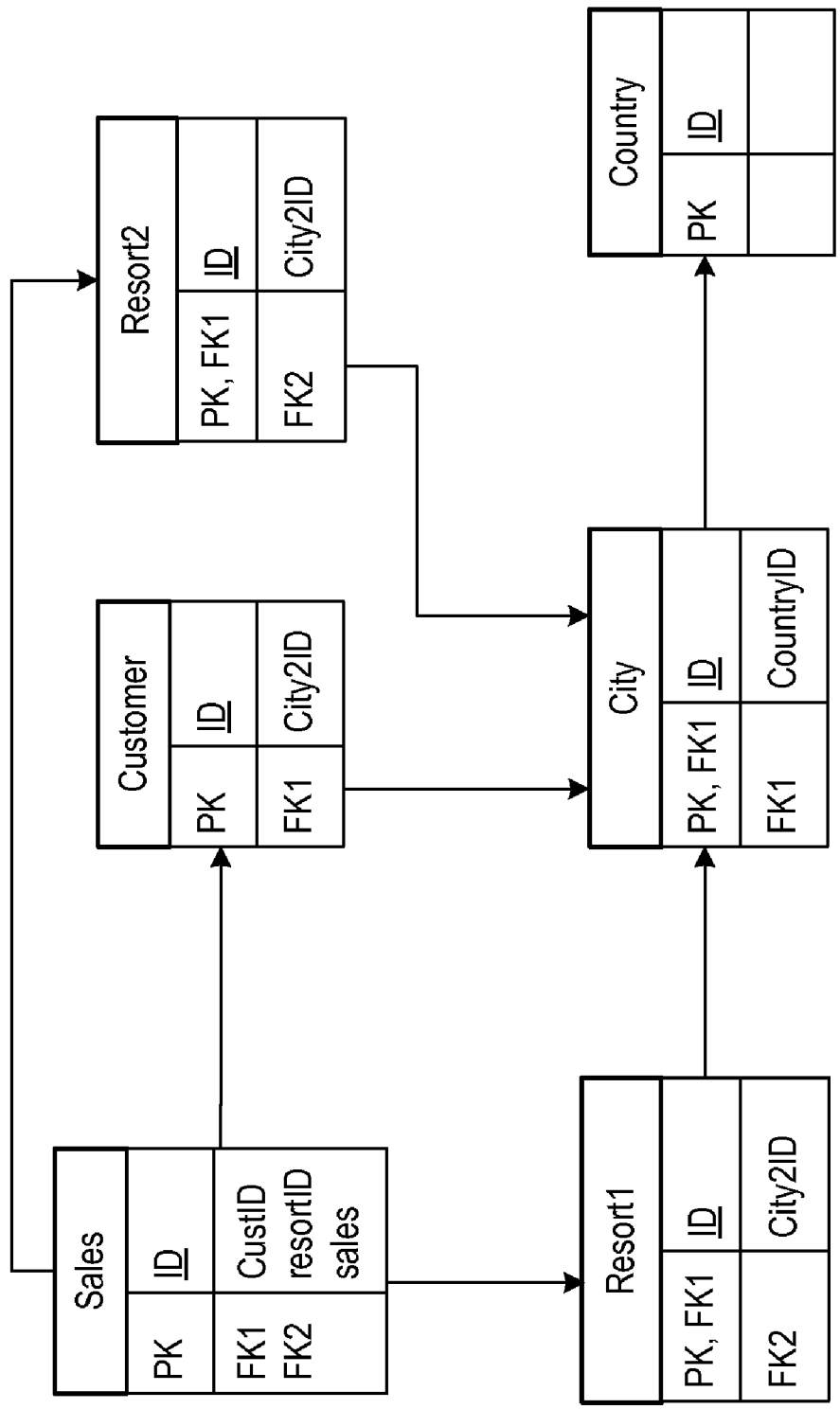
FIG. 13 is a representation of a logical database schema modified to include aliases according to some embodiments.

The Resort object is aliased at 960 because it appears twice in the query with different prefixes. The first alias, Resort1, has the same relationships to other objects as the original Resort object. The second alias, Resort2, is related to the City object and to the Sales object. FIG. 13 is a dynamic representation of logical schema 200, modified to include the created aliases.

Figure 14:
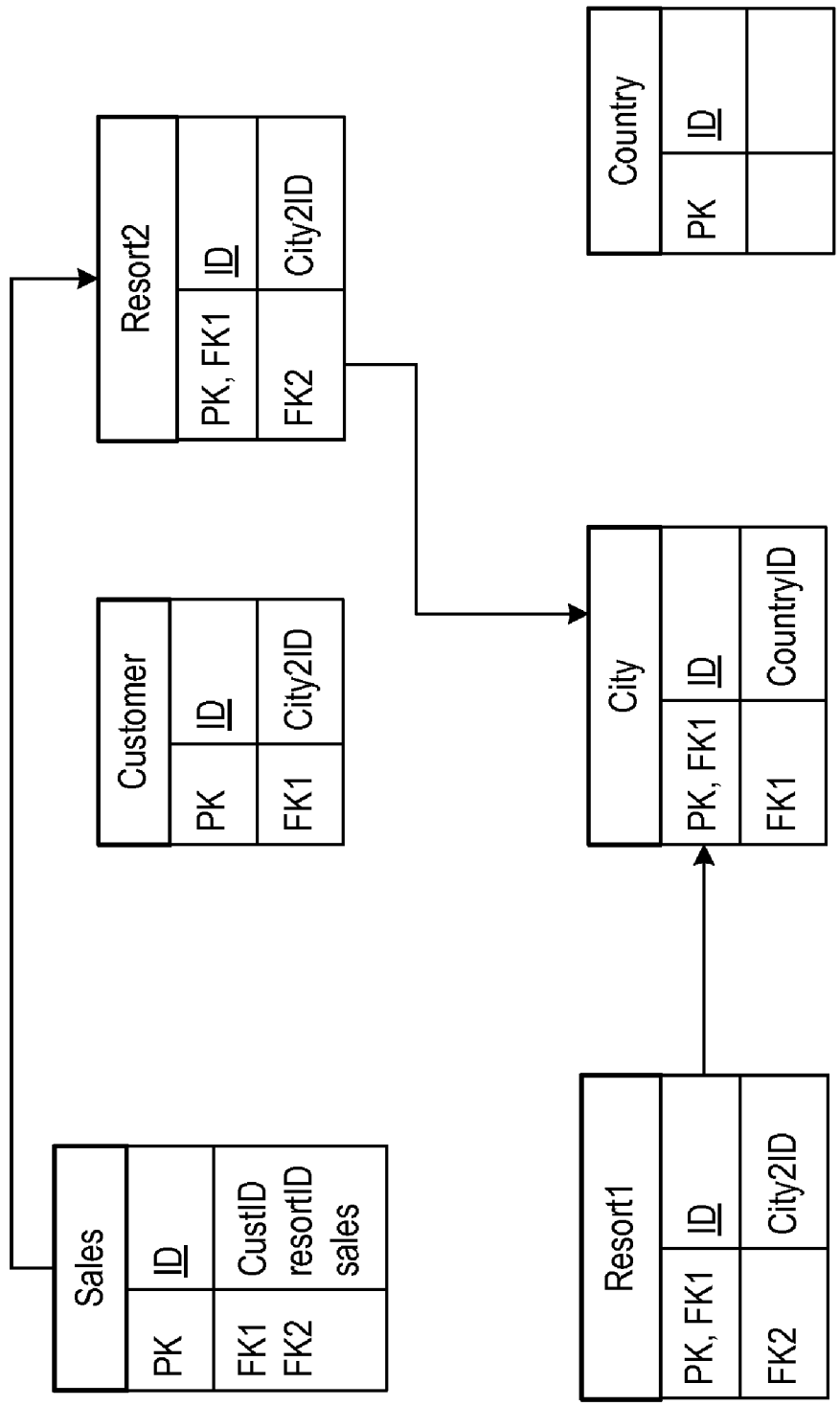
FIG. 14 is a representation of the FIG. 13 logical database schema edited based on enforced functional dependencies according to some embodiments.

Using the aliased objects, the query is rewritten at 970 to (Resort1, CityOfResort1.Resort1OfSales.Sales). Next, the functional dependencies to enforce are determined at 930. The functional dependency that relates Sales, Resort2 and City and that is explicitly mentioned in the query is identified, as well as the functional dependencies which relate the two initial objects in the query, Resort1 and City. All unrelated joins are removed at 940, resulting in the edited schema shown in FIG. 14.

SQL is generated based on the edited schema and modified query at 950. The following is one example of such SQL according to some embodiments.

```
SELECT resort1.ID, sum(Sales.sales)
FROM Resort Resort1, Resort Resort 2, City, Sales
WHERE
(Sales.ResortID = Resort2.ID) AND
(Resort2.CityID = City.ID) AND
```
-continued
```
(resort1.CityID = City.ID)
GROUP BY resort1.ID
```

In existing systems, such queries are normally avoided, because the queries apply a join path that contains a fan trap and are thereby considered to return wrong, or "inflated" results. However, in this specific query, the required semantics are precisely those specified by the fan trap—to compute a same measure value (i.e., the sales in a city) several times for each resort in the city.

Process 900 can be similarly applied in the case of properties that relate an object to itself. For instance, an object Employee may include a property Manager, the target of which is the same object Employee, since an employee's manager is also an employee. Generally, to determine functional dependencies for enforcement, those that introduce loops are not considered unless they are explicitly mentioned in the query.

Given the query (Sales, Employee.Manager), it is determined that the same object (Employee) appears twice (i.e., once as the initial object, once as the target of the Manager property), and the two prefixes are different. The Employee object and its underlying table are therefore aliased at 960 and the query is modified at 970 to (Sales, Employee1.Manager2), where the target of property Manager2 is a second alias of the object Employee (e.g., Employee2).

Each of the objects Employee1 and Employee2 will be mapped to a different logical view of the same table Employee. These two aliased tables will be joined through an alias of the join that maps the Manager property, typically a self-join. The final SQL generated for this query will follow a usual design pattern used to navigate parent-child hierarchies stored in relational databases, and where self-joins are replaced with joins between aliased tables. However, instead of having to create "flattened" views of the parent-child relationship as is conventionally done, embodiments provide a dynamic and temporary process.

The SQL examples provided above are for illustration only. Embodiments may be applied to any abstraction layer and query generation technology that operates in conjunction with a logical set of entities and relationships, and retrieves data by associating certain entities and relationships to the objects of a symbolic query, and then by interpreting the entities and relationships in terms of some underlying physical data source from which it would retrieve data in an unspecified way.

Embodiments may operate in conjunction with any data source that can be modeled under an entity-relationship model to which entities and relationships can be added or removed dynamically, and for which there exists an (unspecified) method for interpreting queries in terms of this (possibly modified) entity-relationship model and retrieving the data.

A capability model can be added to describe which queries should be accepted and which ones should be rejected because they are too complex or impossible to interpret by the data source. For instance, in OLAP models, dimensions are supposed to be independent from each other. For instance, a Product dimension and a Country dimension could be used to define an OLAP Cube. The Product dimension may also have an attribute CountryOfManufacturing. Normal OLAP systems do not support the consideration that the country of manufacturing of a given product is also a member of the Country dimension. However, it is technically possible, even if not very efficient, to run MDX queries that set certain conditions between two of the dimensions in the cube. For example, the aggregation of all sales of a product in its country of manufacturing can be specified, using a sub-cube that generates tuples filtered on the comparison of the caption of their Country component with the caption of the attribute Country of their Product component. Accordingly, embodiments may operate in conjunction with a semantic layer that models CountryOfManufacturing as a property of source object Product and target object Country. More generally, it is possible to model properties that relate dimensions of a cube to one another, and use embodiments to interpret queries using these properties. A capability model may be desired to specify the maximum degree of complexity allowed for performance reasons.

Embodiments described herein are solely for the purpose of illustration. Those in the art will recognize other embodiments may be practiced with modifications and alterations to that described above.

What is claimed is:

1. A method to query a database of physical tables based on a logical database schema including logical tables mapped to the physical tables and on an abstraction layer comprising a plurality of objects mapped to the logical tables and one or more properties associating one or more of the plurality of objects to one or more others of the plurality of objects, the method comprising:
receiving a query comprising a first plurality of objects of the abstraction layer, and a first one or more properties associating one of the first plurality of objects with another one of the plurality of objects, the query comprising two or more instances of a first one of the first plurality of objects;
modifying a dynamic representation of the logical database schema to include an alias of the first one of the plurality of objects;
modifying the query to include the alias;
identifying one or more functional dependencies of the abstraction layer within a reverse chain or a direct chain of the modified query, or relating to initial objects of the modified query;
editing the modified dynamic representation by removing joins of the modified dynamic representation of logical database schema associated with non-identified functional dependencies of the modified query; and
generating a database query based on the modified query and the edited dynamic representation.

2. A method according to claim 1, wherein modifying the query to include the alias comprises:
replacing one of the two or more instances of the first one of the first plurality of objects with the alias.

3. A method according to claim 2, wherein the modified query does not include more than one instance of any of the first plurality of objects or of the alias.

4. A method according to claim 1, further comprising:
receiving a second query comprising a second plurality of objects of the abstraction layer, and a second one or more properties associating one of the first plurality of objects with another one of the plurality of objects;
determining that the second query does not include two or more instances of any of the second plurality of objects;
determining a second one or more functional dependencies of the abstraction layer to be enforced based on the second query;
editing a second dynamic representation of the logical database schema based on the second one or more functional dependencies; and
generating a second database query based on the second query and the edited second dynamic representation.

5. A method according to claim 4, wherein determining the second one or more functional dependencies comprises:
identifying zero or more functional dependencies within a reverse chain or a direct chain of the second query; and
identifying zero or more functional dependencies relating to initial objects of the second query, and
wherein editing the second dynamic representation comprises removing joins of the second dynamic representation associated with non-identified functional dependencies of the second query.

6. A method according to claim 4, wherein generating the second database query comprises:
determining a path through the edited second dynamic representation based on the second query; and
generating Structured Query Language statements based on the determined path.

7. A method according to claim 1, wherein generating the database query comprises:
determining a path through the edited dynamic representation based on the modified query; and
generating Structured Query Language statements based on the determined path.

8. A computer-readable medium having stored thereon program code, the program code executable by a computer to query a database of physical tables based on a logical database schema including logical tables mapped to the physical tables and on an abstraction layer comprising a plurality of objects mapped to the logical tables and one or more properties associating one or more of the plurality of objects to one or more others of the plurality of objects, the program code executable to:
receive a query comprising a first plurality of objects of the abstraction layer, and a first one or more properties associating one of the first plurality of objects with another one of the plurality of objects, the query comprising two or more instances of a first one of the first plurality of objects;
modify a dynamic representation of the logical database schema to include an alias of the first one of the plurality of objects;
modify the query to include the alias;
identify one or more functional dependencies of the abstraction layer within a reverse chain or a direct chain of the modified query, or relating to initial objects of the modified query;
edit the modified dynamic representation by removing joins of the modified dynamic representation of logical database schema associated with non-identified functional dependencies of the modified query; and
generate a database query based on the modified query and the edited dynamic representation.

9. A medium according to claim 8, wherein the code executable to modify the query to include the alias comprises code executable to replace one of the two or more instances of the first one of the first plurality of objects with the alias.

10. A medium according to claim 9, wherein the modified query does not include more than one instance of any of the first plurality of objects or of the alias.

11. A medium according to claim 8, the program code further executable to:
receive a second query comprising a second plurality of objects of the abstraction layer, and a second one or more properties associating one of the first plurality of objects with another one of the plurality of objects;

determine that the second query does not include two or more instances of any of the second plurality of objects;

determine a second one or more functional dependencies of the abstraction layer to be enforced based on the second query;

edit a second dynamic representation of the logical database schema based on the second one or more functional dependencies; and generate a second database query based on the second query and the edited second dynamic representation.

12. A medium according to claim 11, wherein the code executable to determine the second one or more functional dependencies comprises code executable to:

identify zero or more functional dependencies within a reverse chain or a direct chain of the second query; and identify zero or more functional dependencies relating to initial objects of the second query, and wherein the code executable to edit the second dynamic representation comprises code executable to remove joins of the second dynamic representation associated with non-identified functional dependencies of the second query.

13. A medium according to claim 11, wherein the code executable to generate the second database query comprises code executable to:

determine a path through the edited second dynamic representation based on the second query; and generate Structured Query Language statements based on the determined path.

14. A medium according to claim 8, wherein the code executable to generate the database query comprises:

code executable to determine a path through the edited dynamic representation based on the modified query; and code executable to generate Structured Query Language statements based on the determined path.

15. A system comprising:

a database of physical data tables;

a logical database schema of logical tables associated with the physical data tables;

an abstraction layer comprising a plurality of objects mapped to the logical tables and one or more properties associating one or more of the plurality of objects to one or more others of the plurality of objects; and a query generator to:

receive a query comprising a first plurality of objects of the abstraction layer, and a first one or more properties associating one of the first plurality of objects with another one of the plurality of objects, the query comprising two or more instances of a first one of the first plurality of objects;

modify a dynamic representation of the logical database schema to include an alias of the first one of the plurality of objects;

modify the query to include the alias;

identify one or more functional dependencies of the abstraction layer within a reverse chain or a direct chain of the modified query, or relating to initial objects of the modified query;

edit the modified dynamic representation by removing joins of the modified dynamic representation of logical database schema associated with non-identified functional dependencies of the modified query; and generate a database query based on the modified query and the edited dynamic representation.

16. A system according to claim 15, wherein modification of the query to include the alias comprises replacement of one of the two or more instances of the first one of the first plurality of objects with the alias.

17. A system according to claim 15, the query generator further to:

receive a second query comprising a second plurality of objects of the abstraction layer, and a second one or more properties associating one of the first plurality of objects with another one of the plurality of objects;

determine that the second query does not include two or more instances of any of the second plurality of objects;

determine a second one or more functional dependencies of the abstraction layer to be enforced based on the second query;

edit a second dynamic representation of the logical database schema based on the second one or more functional dependencies; and generate a second database query based on the second query and the edited second dynamic representation.

* * * * *